United States Patent Office 3,398,056
Patented Aug. 20, 1968

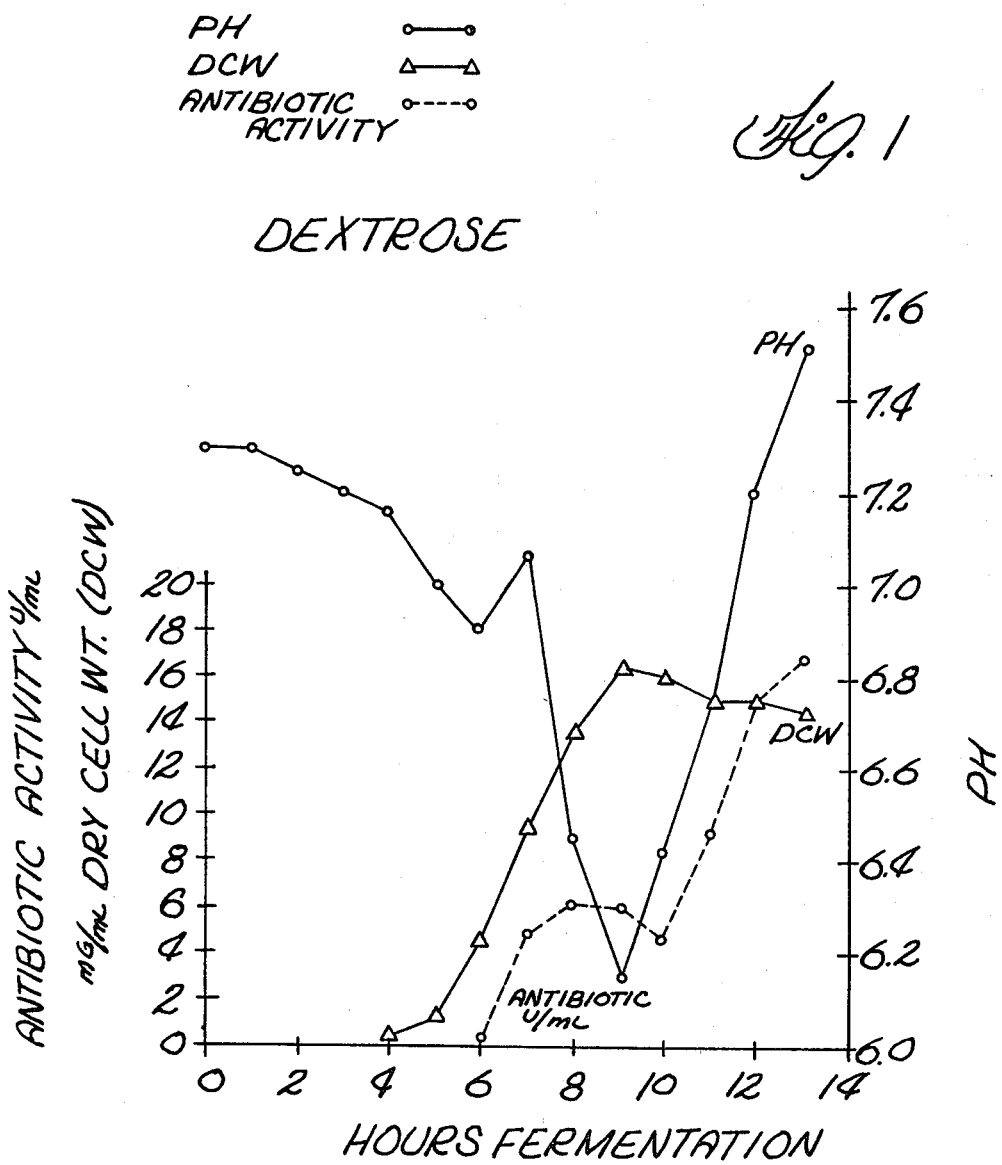

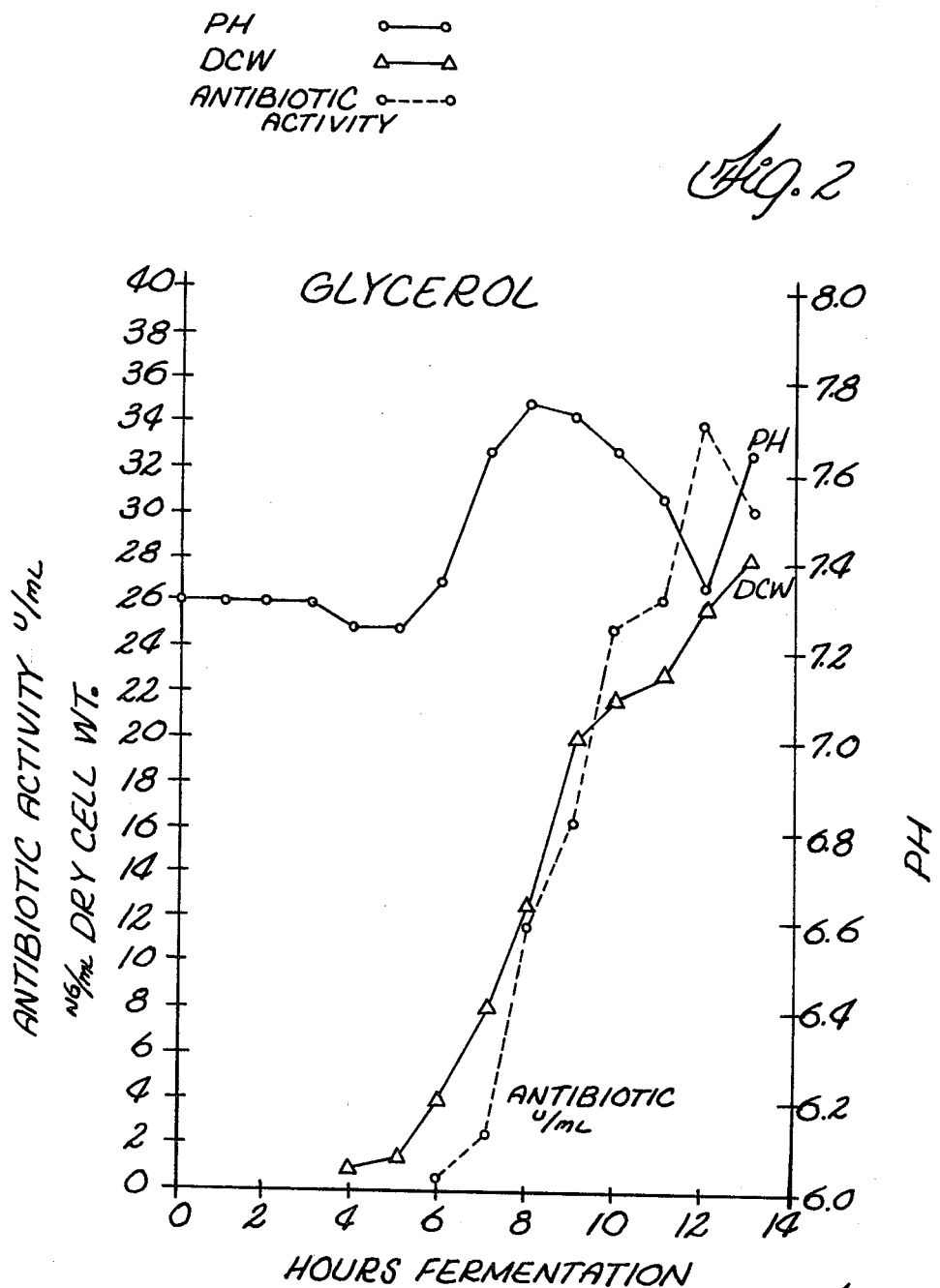

3,398,056
PROCESS FOR PRODUCING LYSOSTAPHIN BY FERMENTATION
Walter Anthony Zygmunt and Henry Polk Browder, Evansville, Ind., assignors to Mead Johnson & Company, Evansville, Ind., a corporation of Indiana
Filed July 10, 1964, Ser. No. 381,684
8 Claims. (Cl. 195—80)

The present invention is concerned with improvements in the production of lysostaphin by fermentation. Lysostaphin is an antibiotic which has the specific capacity to lyse organisms of the genus Staphylococcus. Its production by fermentation is described in application Ser. No. 191,664, filed Apr. 19, 1962, now U.S. Patent 3,278,378.

Application Ser. No. 191,664 discloses fermentations of *Staphylococcus staphylolyticus* on media containing as nitrogen-supplying nutrients proteinaceous ingredients such as peptone pancreatic digest of casein, papaic digest of soy meal, etc. It is also disclosed that the fermentation medium tends to become acidic in the early stages of the fermentation. This tendency is counterbalanced as the fermentation proceeds with the liberation of basic substances, presumably ammonia, resulting in a rather sharp increase in pH in the later stages. Both of these effects are detrimental to the production of lysostaphin by the organism, the optimum pH being stated to be pH 7.3 to 7.7.

This state of affairs is illustrated in FIGURE 1 which comprises three graphs plotted on the same set of rectangular coordinates. Each refers to the same lysostaphin fermentation run conducted as disclosed in Ser. No. 191,664 employing the nutrient medium described below. The fermentation was conducted during a 13 hr. period at 37° C. in a 10 gal. stainless steel fermenter employing 20 l. of medium. The inoculum consisted of 0.25% by volume of a log phase culture of *S. staphylolyticus* NRRL B-2628. The pH of the medium was adjusted to 7.3 at the outset. Aeration was maintained at a rate of one volume of air per volume of medium per minute.

| Medium composition: | Percent by weight |
|---|---|
| Enzymatically hydrolyzed casein (NZ Amine E) | 4.8 |
| Soy peptone (Phytone) | 0.5 |
| Sodium chloride | 0.5 |
| Dipotassium hydrogen phosphate | 0.25 |
| Dextrose | 1.0 |

The graph shown by the solid line in FIGURE 1 refers to the right hand ordinate where a scale of pH values is shown. The abscissa represents time expressed in hours reading from the left. The initial value of pH 7.3 decreases in the course of the fermentation to a minimum value of pH 6.15 after 9 hrs. At this time a sharp increase in pH commences, a value of pH 7.5 being reached after 13 hrs. In other fermentations final pH values substantially higher than this have been frequently observed.

The broken line in FIGURE 1 is a graph of lysostaphin assay expressed in units of activity per ml. of medium. The assay values were determined by the method described in application Ser. No. 191,664 referred to above. This is a photometric method in which one unit of lysostaphin is designated as being contained in that amount of sample which causes a 50% reduction in turbidity in 10 min. of a suspension of *S. aureus* FDA 209P cells of specified concentration relative to an identical control suspension which is not exposed to the test sample of lysostaphin. The legend for lysostaphin assay appears on the left hand ordinate.

The left hand ordinate also contains a scale which expresses the dry cell weight of the *S. staphylolyticus* culture contained in the fermentation medium in terms of mg. thereof per ml. of medium. This scale has reference to the third graph in FIGURE 1 shown in triangular points (△) representing the change in dry cell weight (DCW) relative to time. Cell growth reaches a measurable value after about 4 hrs. After 6 hrs. lysostaphin is detected in the fermentation medium. These two values increase in roughly parallel fashion until about the eighth hour when antibiotic production becomes static at a concentration of about 6 units/ml. as the pH falls below pH 6.3. Antibiotic production resumes as the pH increases after 10 hrs. reaching about 17 units/ml. after 13 hrs. Cell growth appears to reach a plateau value after 9 hrs., and then commences a gradual decline.

Optimum conditions as to pH exist for a relatively short period of time during such a fermentation. Steps may, of course, be taken to continuously adjust the pH by the addition of acid or base during fermentation, but this adds to the cost of the process when conducted on a commercial scale.

The present invention has for one object the production of lysostaphin fermentation broths with higher antibiotic titers than have been heretofore obtainable. It has for a further object the provision of a fermentation process for the production of lysostaphin having reduced requirements for pH control during the fermentation period, both for the purpose of achieving economies in large scale production.

The aforementioned fermentation illustrated in FIGURE 1 fulfills the first objective of this invention and in fact constitutes an embodiment thereof. It has been found that unexpectedly large increases in antibiotic yield are obtained if a relatively high concentration of enzymatically hydrolyzed casein is used as nitrogen-supplying nutrient in the fermentation medium. Fermentation broths containing at least about 4% by weight of enzymatically hydrolyzed casein as nitrogen-supplying nutrient consistently yield exceptionally high antibiotic titers in fermentations conducted otherwise as disclosed in application Ser. No. 191,664. Thus, the fermentaton illustrated in FIGURE 1 employing a medium containing 4.8% by weight of enzymatically hydrolyzed casein afforded an antibiotic titer of 17 units per ml. while that described in Example 1 of Ser. No. 191,664, which differed principally in the concentration of this nutrient in the medium employed, afforded a yield of 2.5 units per ml.

The second object of this invention is satisfied by employing an aqueous nutrient medium containing glycerol, mannose, or galactose as assimilable carbon nutrient in the place of dextrose or other similar carbohydrate nutrient. The surprising discovery has been made that by the use of one of these assimilable carbon nutrients the need for pH adjustment during the fermentation period is eliminated and still further improvements in antibiotic yield are obtained.

FIGURE 2 is constituted of a group of graphs of a type similar to FIGURE 1 which illustrate the favorable effect on pH of employing 1.0% by weight of glycerol as assimilable carbon nutrient. This fermentation was otherwise identical to that of FIGURE 1. The initial value of pH 7.3 is seen to remain relatively constant for approximately the first 6 hrs. and to then undergo an increase to a value of pH 7.75, whereupon it again commences to decrease to a value of pH 7.35 after 12 hrs. Again growth of the organism commences at approximately 4 hrs, with antibiotic production becoming evident at approximately 6 hrs., both increasing in parallel fashion. Substantially more luxuriant growth and greater antibiotic production, however, occurs, the maximum antibiotic concentration in this particular experiment being about 35 units per ml. after 12 hrs. This fermentation is noted to be markedly different from the dextrose fermentation with respect to the relatively narrow and desirable pH range observed, and the substantially greater concentration of antibiotic formed in the medium.

The two fundamental aspects of this invention illustrated by FIGURES 1 and 2 were illustrated in a somewhat different manner by a series of experiments based upon Example 1 of Ser. No. 191,664. The first experiment constituted a duplication of the aforesaid example employing a fermentation medium containing 1.7% pancreatic digest of casein (Trypticase, Baltimore Biological Laboratories), 0.3% papaic digest of soya meal (Phytone, Baltimore Biological Laboratories), 0.5% sodium chloride, 0.25% dipotassium acid phosphate, and 0.25% dextrose. The medium was adjusted to pH 7.3, inoculated with S. staphylolyticus NRRL B-2628, and incubated for 17 hrs. at 37° C. in a shake flask. At the conclusion of the fermentation, the broth was assayed for lysostaphin activity and the pH thereof measured.

In the first series, the amount of pancreatic digest of casein was increased to 3, 5, 7, and 10%, and the effect on the antibiotic titer and pH of the medium observed. Two identical series were conducted therewith employing rather than 0.25% by weight of dextrose in the fermentation medium, 1.0% by weight thereof, or 1.0% by weight of glycerol. The results are arranged in the following table.

stantially higher antibiotic titers are obtained, values of 40.5 and 44.3 units per ml. having been recorded in this experiment.

A series of comparable experiments was conducted to ascertain whether other mono- and disaccharides behave in a fashion similar to that described above for dextrose, and also to ascertain whether other polyols such as sorbitol or mannitol could be substituted for glycerol. These experiments were of the shake flask variety employing 10 ml. of medium contained in a 250 ml. Erlenmeyer flask held on a rotary shaker operating at 250 to 300 r.p.m. per min. and at a temperature of 37° C. The inoculum consisted of 0.02% by volume of a log phase culture of S. staphylolyticus NRRL B-2628. A medium of the following composition, adjusted at the outset to pH 7.3, was employed:

|   | Percent by weight |
|---|---|
| Enzymatically hydrolyzed casein | 4.82 |
| Sodium chloride | 0.5 |
| Dipotassium hydrogen phosphate | 0.25 |
| Soy peptone | 0.5 |
| Carbon nutrient, various amounts as specified in the table. | |

The accompanying table records the pH values and lysostaphin concentrations of the media for the various

TABLE I.—EFFECT OF CASEIN HYDROLYSATE CONCENTRATION

| Nutrient, casein hydrol. | Dextrose, 0.25% | | Dextrose, 1.0% | | Glycerol, 1.0% | |
|---|---|---|---|---|---|---|
|  | Assay | pH | Assay | pH | Assay | pH |
| 1.7% by wt | 2.6 | 8.45 | 1.2 | 5.00 | 0.5 | 6.80 |
| 3.0% by wt | 4.8 | 8.55 | 3.7 | 5.15 | 11.4 | 6.95 |
| 5.0% by wt | 11.2 | 8.60 | 9.5 | 5.55 | 17.8 | 7.70 |
| 7.0% by wt | 17.8 | 8.60 | 16.5 | 6.25 | 40.5 | 7.80 |
| 10.0% by wt | 17.3 | 8.50 | 22.8 | 7.30 | 44.3 | 7.95 |

A substantial increase in antibiotic titer was observed in those experiments employing 5% by weight of pancreatic digest of casein as nitrogen-supplying nutrient as compared to those containing concentrations of 3% or less of this ingredient. Further increases in antibiotic titer were obtained carbon nutrients at several concentrations after 17 hr. fermentation periods. Lysostaphin concentration is reported in units of activity per milliliter of medium as determined by the assay procedure described in application Ser. No. 191,664.

TABLE II.—RELATIONSHIP OF NATURE AND CONCENTRATION OF CARBON NUTRIENT TO LYSOSTAPHIN PRODUCTION AND pH

| Carbon Nutrient, percent [1] | Glycerol | | Galactose | | Mannose | | Dextrose | | Lactose | |
|---|---|---|---|---|---|---|---|---|---|---|
|  | Assay [2] | pH | Assay [2] | pH | Assay [2] | pH | Assay [2] | pH | Assay [2] | pH |
| 0.25 | 12.4 | 8.70 | 6.2 | 8.75 |  |  | 12.4 | 8.40 |  |  |
| 0.5 | 25.6 | 8.30 | 15.5 | 8.70 | 18.1 | 7.95 | 16.8 | 7.80 | 7.9 | 8.0 |
| 1.0 | 32.4 | 7.40 |  |  | 17.2 | 7.70 | 3.0 | 5.55 | 2.1 | 5.70 |
| 1.5 | 23.6 | 6.55 | 20.0 | 5.90 | 18.2 | 7.80 | 6.8 | 5.50 | 1.3 | 5.35 |
| 2.0 | 28.8 | 6.55 | 20.0 | 5.85 | 17.8 | 7.95 | 6.9 | 5.40 | 1.3 | 5.40 |
| 4.0 | 22.8 | 6.65 | 17.8 | 5.80 | 16.6 | 7.90 | 7.2 | 5.40 | 1.4 | 5.40 |

| Carbon Nutrient, percent | Sucrose | | L-Arabinose | | Maltose | | Sorbitol | | Mannitol | |
|---|---|---|---|---|---|---|---|---|---|---|
|  | Assay [2] | pH | Assay [2] | pH | Assay [2] | pH | Assay [2] | pH | Assay [2] | pH |
| 0.5 | 4.3 | 8.40 | 0.6 | 9.00 | 0.4 | 9.00 | 0.8 | 8.70 | 0.5 | 8.70 |
| 1.0 | 10.8 | 8.10 | 0.5 | 8.80 | 0.6 | 8.90 | 0.8 | 8.80 | 0.4 | 8.75 |
| 1.5 | 10.6 | 5.90 | 0.2 | 8.90 | 0.8 | 8.85 | 0.8 | 8.80 | 0.4 | 8.80 |
| 2.0 | 11.5 | 5.90 | <0.2 | 8.60 | 1.3 | 8.85 | 0.5 | 8.75 | 0.3 | 8.80 |
| 4.0 | 11.5 | 5.85 | 0.2 | 8.50 | <0.2 | 8.90 | 0.5 | 8.90 | 0.3 | 8.90 |

[1] Percent by weight in medium; approximate values; the concentration of the named nutrient in each instance was adjusted according to its carbon content to provide so-called iso-carbon media at effective concentrations of 0.1, 0.2, 0.4, 0.6, 0.8, and 1.6% by weight carbon respectively.
[2] Units/ml.

served as the percent by weight of enzymatically hydrolyzed casein in the fermentation medium was increased up to about 10%. This invention, then, in its broadest aspect relates to the preparation of lysostaphin by fermentation of S. staphylolyticus on media containing from 4 to 10% by weight of enzymatically hydrolyzed casein as nitrogen-supplying nutrient. Higher concentrations of the enzymatically hydrolyzed casein may be employed, but there is no further advantage derived from the use of more than 10% by weight thereof.

The further advantage of employing glycerol rather than dextrose as carbon-supplying nutrient is apparent from the results shown in Table I. The final pH values in each instance in this series are within or close to the optimum pH range specified in Ser. No. 191,664. Substantially Consistently higher antibiotic titers are obtained employing 0.5% or more of glycerol, or 1.0% or more of mannose or galactose as carbon-containing nutrients as compared to dextrose. The relative freedom from the formation of either excessively acidic or basic fermentation broths is also evident. Certain other nutrients such as sorbitol, mannitol, arabinose, and maltose, which do not produce an acidic fermentation medium, nevertheless fail to provide high antibiotic concentrations.

Considering now the dextrose fermentations shown in Table II, at low concentrations on the order of 0.25% and 0.5% by weight, the tendency for an acidic fermentation medium to be formed is less pronounced. However, as the dextrose concentration is increased in an effort to produce greater quantities of antibiotic per volume of fermentation medium, acid concentrations become substantial, and greatly diminished antibiotic titers result.

The preferred concentration range for the selected assimilable carbon nutrients of this invention, glycerol, mannose, and galactose, is 0.5 to 5% by weight of the medium. Higher concentrations may be employed, but there is no apparent advantage insofar as improvement of antibiotic titer is concerned. At concentrations of less than about 0.5% by weight of glycerol, galactose, or mannose, the amount of assimilable carbon provided appears to be the limiting factor relative to yield.

Various organic nitrogen nutrients were evaluated to ascertain whether the favorable effect observed with glycerol, mannose, and galactose in the casein hydrolysate medium is also operative with other related nutrients. Media of the following composition were prepared.

|  | Percent |
| --- | --- |
| Organic nitrogen nutrient | 5 |
| Soy peptone | 0.5 |
| Sodium chloride | 0.5 |
| Dipotassium hydrogen phosphate | 0.25 |
| Glycerol, galactose, or dextrose | 1.0 |

The media were adjusted to pH 7.3, inoculated, and incubated as described for the preceding experiments in which various carbon nutrients were compared. For each nitrogen nutrient parallel fermentations were conducted, employing glycerol, galactose, and dextrose as principal carbon source.

The results of these experiments are listed below in which the pH of the medium and the lysostaphin assay thereof at end of the fermentation period are listed.

Enzymatic digest of animal tissue (Medo Peptone, Wilson): glycerol, pH 7.10, lysostaphin, 20 units/ml.; dextrose, pH 5.60, lysostaphin, 13.6 units/ml.; galactose, pH 7.85, lysostaphin, 28 units/ml.

Pancreatic digest of heart muscle (Myosate, Baltimore Biological Laboratories): glycerol, pH 7.50, lysostaphin, 21.5 units/ml.; dextrose, pH 5.65, lysostaphin, 4.8 units/ml.; galactose, pH 8.05, lysostaphin, 19.2 units/ml.

Pancreatic digest of gelatin (Gelatone, Difco): glycerol, pH 5.50, lysostaphin, 2.4 units/ml.; dextrose, pH 5.00, lysostaphin, 1.1 units/ml.; galactose, pH 7.80, lysostaphin, 4.4 units/ml.

Peptic digest of animal tissue (Thiotone, Baltimore Biological Laboratories): glycerol, pH 7.65, lysostaphin, 14.9 units/ml.; dextrose, pH 5.40, lysostaphin, <0.2 unit/ml.; galactose, pH 8.00, lysostaphin, 16.0 units/ml.

Soluble animal protein (Swift, SSAP): glycerol, pH 6.40, lysostaphin, 5.2 units/ml.; dextrose, pH 4.70, lysostaphin, <0.4 unit/ml.; galactose, pH 7.30, lysostaphin, 0.7 unit/ml.

In each fermentation luxuriant growth of the *S. staphylolyticus* inoculum occurred. Although variability in the quality of the organic nitrogen nutrients as to antibiotic production is evident, these experiments nevertheless illustrate that uniformly superior results relative to dextrose are obtained with the present carbon nurtients.

A series of experiments was conducted to ascertain the optimum pH for lysostaphin production with *S. staphylolyticus* when employing glycerol as assimilable carbon nutrient. A stainless steel fermenter equipped to automatically regulate the pH of the fermentation medium during the incubation period by the addition of either an acidic or an alkaline neutralizing agent and containing 20 l. of a medium of the following composition was employed.

|  | Percent by weight |
| --- | --- |
| Enzymatically hydrolyzed casein | 4.82 |
| Soy peptone | 0.5 |
| Sodium chloride | 0.5 |
| Dipotassium hydrogen phosphate | 0.25 |
| Glycerol | 1.0 |

The following results were obtained in separate runs controlled at the pH values indicated below.

MAXIMUM LYSOSTAPHIN ASSAY OBSERVED

| pH | Time, (hrs.) | Units/ml. |
| --- | --- | --- |
| 5.0 | 17 | <0.2 |
| 5.5 | 13 | <0.2 |
| 6.0 | 13 | 2.7 |
| 6.5 | 13 | 7.2 |
| 7.0 | 13 | 19.0 |
| 7.5 | 15 | 17.8 |
| 8.0 | 12 | 19.2 |
| 8.5 | 12 | 10.0 |
| 9.0 | 18 | <0.2 |

The pH range of pH 6.5 to 8.5 was found to be advantageous. The most preferred range, however, due to the substantially higher antibiotic titers obtained, is pH 7.0 to pH 8.0. In similar selected experiments the same pH range was found to be operable with dextrose when using from 4.0% to 10% by weight of enzymatically hydrolyzed casein as nitrogen-supplying nutrient.

When used herein the terms nitrogen-supplying nutrient and carbon-supplying nutrient refer to fermentation medium ingredients which are assimilable by the organism *S. staphylolyticus* resulting in growth thereof, as reflected by increase in total cell weight, and in production of the antibiotic lysostaphin. This is the conventional meaning of the terms as understood in the art.

While several particular embodiments of this invention are shown above, it will be understood, of course, that the invention is not to be limited thereto, since many modifications may be made, and it is contemplated, therefore, by the appended claims to cover any such modifications as fall within the true spirit and scope of this invention.

What is claimed is:

1. In a fermentation process for the production of lysostaphin in which a strain of the organism *Staphylococcus staphylolyticus* is cultivated on an aqueous nutrient medium comprised of carbon- and nitrogen-supplying nutrients, the improvement which comprises employing at least 4% by weight of enzymatically hydrolyzed casein as nitrogen-supplying nutrient in an aqueous nutrient medium having a pH in the range pH 6.5 to pH 8.5.

2. The fermentation process for the production of lysostaphin which comprises cultivating a strain of *Staphylococcus staphylolyticus* on an aqueous nutrient medium having pH 6.5 to pH 8.5 and containing from 4% to 10% of enzymatically hydrolyzed casein and a carbon-supplying nutrient until substantial lytic activity for species of Staphylococcus other than *S. staphylolyticus* is imparted thereto.

3. In a fermentation process for the production of lysostaphin in which a strain of the organism *Staphylococcus staphylolyticus* is cultivated on an aqueous nutrient medium comprised of carbon- and nitrogen-supplying nutrients, the improvement which comprises employing at least about 0.5% of a carbon-suplying nutrient selected from the group consisting of glycerol, mannose, and galactose and pH 6.5 to pH 8.5.

4. The fermentation process for the production of lysostaphin which comprises cultivating a strain of *Staphylococcus staphylolyticus* on an aqueous nutrient medium having pH 6.5 to pH 8.5 and containing 0.5% to 5.0% by weight of a nutrient selected from the group consisting of glycerol, mannose, and galactose and a nitrogen-supplying nutrient until substantial lytic activity for species of Staphylococcus other than *S. staphylolyticus* is imparted thereto.

5. The process of claim 4 wherein said nutrient is galactose.

6. The process of claim 4 wherein said nutrient is mannose.

7. The process of claim 4 wherein said nutrient is glycerol.

8. The fermentation process for the production of lysostaphin which comprises cultivating a strain of *Staphy-* lococcus staphylolyticus on an aqueous nutrient medium having a pH in the range pH 6.5 to pH 8.5 and containing from 4% to 10% by weight of enzymatically hydrolyzed casein and from 0.5% to 5.0% by weight of a carbon-supplying nutrient selected from the group consisting of glycerol, mannose, and galactose until substantial lytic activity for species of *Staphylococcus* other than *Staphylococcus staphylolyticus* is imparted thereto.

References Cited

UNITED STATES PATENTS

| | | | |
|---|---|---|---|
| 2,739,924 | 3/1956 | Lein et al. | 195—80 |
| 3,178,341 | 4/1965 | Hamill et al. | 195—80 X |
| 3,278,378 | 10/1966 | Schindler et al. | 195—80 X |

LIONEL M. SHAPIRO, *Primary Examiner.*